United States Patent [19]

Schawann et al.

[11] Patent Number: 4,596,531

[45] Date of Patent: Jun. 24, 1986

[54] DEVICE FOR LIGHTENING AN UNDERSEA PRODUCTION RISER BY MEANS OF FLOATING BODIES

[75] Inventors: Jean C. Schawann, Idron; Jean P. Caumont, Pau; Jean Falcimaigne, Bois Colombes, all of France

[73] Assignee: Societe Nationale Elf Aquitaine (Production), Paris, France

[21] Appl. No.: 650,792

[22] Filed: Sep. 14, 1984

[30] Foreign Application Priority Data

Sep. 15, 1983 [FR] France ................. 83 14665

[51] Int. Cl.⁴ ............................................. B63B 22/00
[52] U.S. Cl. ....................................... 441/133; 166/350
[58] Field of Search ............... 441/133, 134; 405/195; 166/350

[56] References Cited

U.S. PATENT DOCUMENTS

| | | | |
|---|---|---|---|
| 3,705,432 | 12/1972 | Watkins | 441/133 |
| 3,729,756 | 5/1973 | Cook et al. | 441/133 |
| 3,768,842 | 10/1973 | Ahlstone | 166/350 |
| 3,793,657 | 2/1974 | Kaas | 441/133 |
| 4,176,986 | 12/1979 | Taft et al. | 441/133 |
| 4,332,509 | 6/1982 | Reynard et al. | 166/350 |
| 4,351,257 | 9/1982 | Brown | 114/219 |
| 4,388,025 | 6/1983 | Evans | 114/219 |
| 4,470,722 | 9/1984 | Gregory | 166/350 |

FOREIGN PATENT DOCUMENTS 2037631 12/1970 France ................. 441/133

Primary Examiner—Sherman D. Basinger
Assistant Examiner—Stephen P. Avila
Attorney, Agent, or Firm—Poms, Smith, Lande & Rose

[57] ABSTRACT

A device is provided for lightening an undersea production riser having a central tube surrounded by peripheral stringers. Foamed resin collars are stacked on the central tube. They have a central opening for passing the central tube therethrough and channels disposed concentrically for passing the peripheral lines therethrough. The wall of the central channel is lined with a reinforced material and it has a conical shape for fitting the part of the lining projecting from the end of the collar into the central channel of the adjacent collar. Centering of the collars is provided by two half shells made from metal sheet bearing on the central tube and on the wall of the central channel.

1 Claim, 3 Drawing Figures

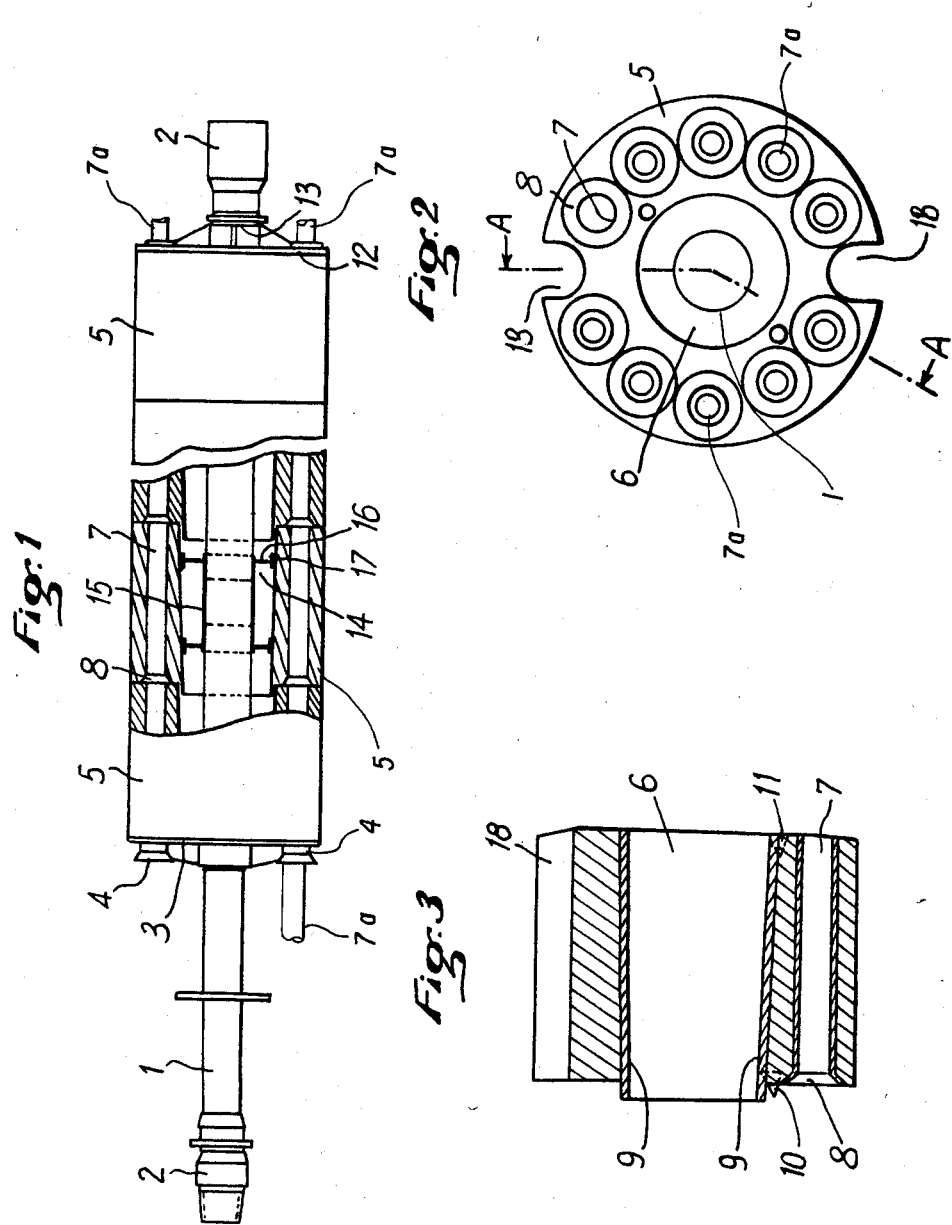

DEVICE FOR LIGHTENING AN UNDERSEA PRODUCTION RISER BY MEANS OF FLOATING BODIES

The invention relates to a lightening device for an undersea production riser comprising a central tube surrounded by peripheral stringers.

BACKGROUND OF THE INVENTION

During working of an undersea station having a collecting head or wellhead, the production riser is normally suspended from a floating structure, for example a semi submersible structure possibly having dynamic positioning means.

In order to lighten the weight of a central tube recourse is had to floatation devices, for example by surrounding the central tube with half shells made from a material with positive buoyancy held by straps. In this case, the installation of the peripheral stringers as an external stack is provided by means of steel guide funnels carried by the central tube. Such arrangements make the assembly very heavy and not easy to handle.

SUMMARY OF THE INVENTION

The present invention provides a lightening device not having this disadvantage which allows compact and lightened arrangement of the assembly formed by the central tube and the peripheral stringers. The present invention relates to a lightening device for at least one element of a production riser comprising a central tube surrounded by peripheral risers by means of floating bodies, wherein collars of a material with positive buoyancy are stacked axially between two end plates and comprise a central channel for passing the central tube therethrough and channels disposed on a circumferance in a ring about the central channel for passing the peripheral stringers therethrough.

In a particular arrangement, the wall of the central channel is coated with a strengthened reinforcing material, which coating extends beyond the edge of one of the front faces of the collar so as to fit into the central channel of the adjacent collar.

The material of the collar may be formed by a molded foamed resin whereas the coating may be glass fiber reinforced epoxy resin.

Centering of the collar on the central tube is preferably provided by centering elements in the form of two half shells made from metal sheet bearing on the central tube and on the wall of the central channel of the collars.

Angular centering of the collars may be achieved by providing one of the collar front faces with at least one centering stud which penetrates into a corresponding housing formed in the opposite front face of an adjacent collar.

BRIEF DESCRIPTION OF THE DRAWINGS

Other features of the device of the invention will be clear from the description of one embodiment given here after by way of example with reference to the drawings in which:

FIG. 1 is a longitudinal view, partially in section, of an element of the production riser, FIG. 2 is a cross sectional view of a collar, and FIG. 3 is an axial sectional view through A—A of FIG. 2.

DESCRIPTION OF THE PREFERRED EMBODIMENT

A production riser element shown in FIG. 1 comprises a central tube element 1 having screw connections 2 at both ends. An end plate or thrust take-up plate 3, interlocked, for example by means of a sleeve, with tube 1 is placed proximate one end of the tube. This plate, provided with grooves, carries funnels 4 spaced apart along the axes of the peripheral stringers 7a about tube 1. The positive buoyancy elements are formed by collars 5 made from a light material such as foamed resin. These collars have a central opening 6 forming a channel for passing therethrough the central tube 1 about which are disposed concentrically channels 7 for passing the peripheral stringers 7a therethrough.

One end of channel 7 has a funnel shape 8 for facilitating mounting of the peripheral stringers, when the collars have been stacked on the central tube 1.

A front face of the collars carries two centering studs 10 fixed by means of screws whereas the opposite face has corresponding hollow housings 11.

The collars are simply fitted on. In fact, the wall of the central channel 6 is lined with a reinforced material 9 such as epoxy resin reinforced with glass fibers, and this lining extends from one end of collar 5.

In the example shown, the wall of the central channel has a slight conical shape, so that the part of the lining extending from the end of the collar can fit into the central channel of the adjacent collar. Other fitting devices may also be used, for example in cylindrical channels with constant section the part extending from the edge of the collar may be given a shape with reduced diameter. The walls of channel 7 for housing the peripheral stringers are also lined with a reinforced material.

Axial clamping of collars 5 against plate 3 integral with the central tube is achieved by placing an end plate 12 having grooves or not against the endmost collar 5 and by fixing a clamping plate 13 to the central tube.

By means of bolts (not shown) carried by plate 13, an axial thrust is exerted against plate 12, so as to clamp the assembly of collars against the thrust take-up plate 3 placed at the opposite end of said assembly.

Centering of collars 5 on tube 1 is provided by two half shells made from metal sheet 14, each half shell having a sleeve 15 gripping round tube 1 and connected by stiffening arms 16 to plate 17 bearing on the internal face of the collar.

Collars 5 have at their periphery two diametrically opposite longitudinal recesses 18 for housing umbilical conduits. Straps not shown, spaced apart along these recesses are provided so as to prevent disengagement of said conduits.

Mounting of the collars on the central tube 1 having plate 3 is achieved by fitting on the collars, by juxtaposing them and by fixing them as they are positioned by means of the centering half shells 14. Angular positioning of the collars is provided by means of studs 10 engaging in housings 11.

After the endmost plate 12 has been fitted, following the last collar, the clamping plate 13 is fixed to the central tube and the bolts carried by this plate are tightened so as to force the bolt ends against plate 12.

What is claimed is:

1. A lightening device for at least one element of an undersea production riser comprising a central tube surrounded by one or more peripheral stringers, comprising in combination:

a plurality of separable removable collars made from a material having positive buoyancy and stacked in an axial arrangement;

means retaining said collars in stacked relation;

each collar having a central channel for passing the central tube therethrough and rectilinear channels disposed concentrically in a ring about said central channel;

each collar including reinforcing lining for said central channel;

said lining projecting from one end of said collar and adapted to be received in the end of a channel in the adjacent collar;

and means within said central channel of each collar for centering said collar with respect to said central tube;

said means for centering of the collars on the central tube including centering elements in the form of two half shells made from metal sheet bearing on said central tube and on the reinforced lining of the central channel of the collars;

each half shell having a sleeve gripping the central tube, plates bearing on the internal face of the collar, and stiffening arms interconnecting said sleeve and plates.

* * * * *